US008621468B2

(12) United States Patent
Bendapudi et al.

(10) Patent No.: US 8,621,468 B2
(45) Date of Patent: Dec. 31, 2013

(54) MULTI CORE OPTIMIZATIONS ON A BINARY USING STATIC AND RUN TIME ANALYSIS

(75) Inventors: Perraju Bendapudi, Hyderabad (IN); Rajesh Jalan, Hyderabad (IN); Phani Kishore Talluri, Secunderabad (IN)

(73) Assignee: Microsoft Corporation, Redmond, WA (US)

( * ) Notice: Subject to any disclaimer, the term of this patent is extended or adjusted under 35 U.S.C. 154(b) by 1400 days.

(21) Appl. No.: 11/740,895

(22) Filed: Apr. 26, 2007

(65) Prior Publication Data

US 2008/0271021 A1    Oct. 30, 2008

(51) Int. Cl.
*G06F 9/46* (2006.01)
*G06F 9/44* (2006.01)

(52) U.S. Cl.
USPC ........... 718/102; 718/100; 718/104; 718/107; 718/108; 717/127; 717/130; 717/131

(58) Field of Classification Search
USPC ......... 717/100, 102, 104, 107, 108, 127, 130, 717/131; 718/100, 102, 104, 107, 108
See application file for complete search history.

(56) References Cited

U.S. PATENT DOCUMENTS

| | | | |
|---|---|---|---|
| 6,018,759 A * | 1/2000 | Doing et al. | 718/108 |
| 6,226,789 B1 | 5/2001 | Tye et al. | |
| 6,389,587 B1 | 5/2002 | Lewis | |
| 7,013,459 B2 | 3/2006 | Kuch et al. | |
| 7,039,910 B2 | 5/2006 | Kosche et al. | |
| 7,143,404 B2 * | 11/2006 | Haghighat et al. | 717/159 |
| 7,146,607 B2 | 12/2006 | Nair et al. | |
| 7,308,674 B2 * | 12/2007 | Fairweather | 717/103 |
| 7,549,150 B2 * | 6/2009 | Yu | 718/108 |
| 8,024,714 B2 * | 9/2011 | Duffy et al. | 717/136 |
| 2002/0083252 A1 * | 6/2002 | Armstrong et al. | 710/260 |
| 2002/0147760 A1 * | 10/2002 | Torii | 709/107 |
| 2003/0066060 A1 | 4/2003 | Ford | |
| 2003/0233394 A1 * | 12/2003 | Rudd et al. | 709/107 |
| 2004/0123185 A1 * | 6/2004 | Pierce et al. | 714/38 |
| 2004/0199904 A1 * | 10/2004 | Schmidt | 717/130 |
| 2004/0216113 A1 * | 10/2004 | Armstrong et al. | 718/104 |
| 2004/0243981 A1 * | 12/2004 | Luk et al. | 717/130 |

(Continued)

OTHER PUBLICATIONS

"The Sun Studio Binary Code Optimizer", Sheldon Lobo, Nov. 30, 2005, Compiler Technology and Performance Engineering, Sun Microsystems, 6 pgs.

(Continued)

*Primary Examiner* — Emerson Puente
*Assistant Examiner* — Charles Swift
(74) *Attorney, Agent, or Firm* — Microsoft Corporation

(57) ABSTRACT

An apparatus and method provide for profile optimizations at a binary level. Thread specific data may be used to lay out a procedure in a binary. In one example, a hot thread may be identified and a layout may be generated based on the identified hot thread. Also, threads of an application may be ranked according to frequency of execution of the corresponding threads. The layout may be created based on the different threads of differing frequency of execution and conflicts between a hottest thread and each of the other threads of the application. In another example, different threads of the application may conflict. For example, two threads may contain operations that overlap temporally to create a race condition. A layout of the application threads may be created based on conflicting threads.

20 Claims, 11 Drawing Sheets

(56) References Cited

U.S. PATENT DOCUMENTS

| | | | |
|---|---|---|---|
| 2005/0149915 A1 | 7/2005 | Wu et al. | |
| 2005/0204349 A1* | 9/2005 | Lewis et al. | 717/162 |
| 2005/0283780 A1* | 12/2005 | Karp et al. | 718/100 |
| 2006/0041875 A1* | 2/2006 | Peri et al. | 717/151 |
| 2006/0136878 A1 | 6/2006 | Raghunath et al. | |
| 2007/0028056 A1* | 2/2007 | Harris | 711/150 |
| 2007/0074171 A1* | 3/2007 | Burka et al. | 717/127 |
| 2007/0079298 A1* | 4/2007 | Tian et al. | 717/140 |
| 2007/0101332 A1* | 5/2007 | Courchesne et al. | 718/102 |
| 2007/0220513 A1* | 9/2007 | Hwang | 718/1 |
| 2008/0120627 A1* | 5/2008 | Krauss | 719/328 |
| 2008/0126067 A1* | 5/2008 | Haas et al. | 703/17 |
| 2008/0178156 A1* | 7/2008 | Kahlon et al. | 717/126 |

OTHER PUBLICATIONS

"Intel C++ Compiler 9.1 for Mac OS*", Kevin Tureski, 2006, reprinted from the Internet at: http://www.xlsoft.com/en/intel/materials/files/Product_Brief_cmac.pdf, 2 pgs.

"Design and Analysis of Profile-Based Optimization in Compaq's Compilation Tools for Alpha", Robert Cohn and P. Geoffrey Lowney, Feb. 2000, Journal of Instruction-Level Parallelism 3, 25 pgs.

"Mostly-Static Program Partitioning for Dynamic Parallelization of Binary Executables", Efe Yardimci and Michael Franz, Apr. 2008, ACM Transactions of Programming Languages and Systems, vol. V, No. N, pp. 1-54.

* cited by examiner

MULTI CORE OPTIMIZATIONS ON A BINARY USING STATIC AND RUN TIME ANALYSIS

BACKGROUND

Applications are typically created based on modularity and readability. However, control flows in the application are typically not emphasized during the development or deployment of such applications. Therefore, to enhance performance of applications, optimization has become increasingly utilized. Optimization may be accomplished by using basic data block or edge counts.

However, typically, optimization of applications may be inadequate because information on which data blocks are executed or which threads of the applications execute which data blocks is unavailable. Therefore, in many scenarios, optimization is problematic.

For example, when access to a same data block by multiple threads is performed in a multi-core environments, cache coherency issues, among other issues may resulted in degraded performance. Similarly, the actual execution sequence of each thread of an application is typically not utilized when determining optimization parameters.

Thus, there is a need for creating a profile or a layout containing information for effectively optimizing or enhance performance of an application.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, a method is described in which a layout is created based on threads of an application. The application may be executed and a profile may be generated based on results of the execution of the application. The profile may include, for example, information on the threads of the application. The layout may be created to enhance or optimize performance of the application.

In another example, a system is described in which a layout may be created for an application based on the threads or execution of the threads of the application.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Systems described herein are provided as examples and not limitations. As those skilled in the art will appreciate, the present examples are suitable for application in a variety of different types of computing systems.

Figure 1:
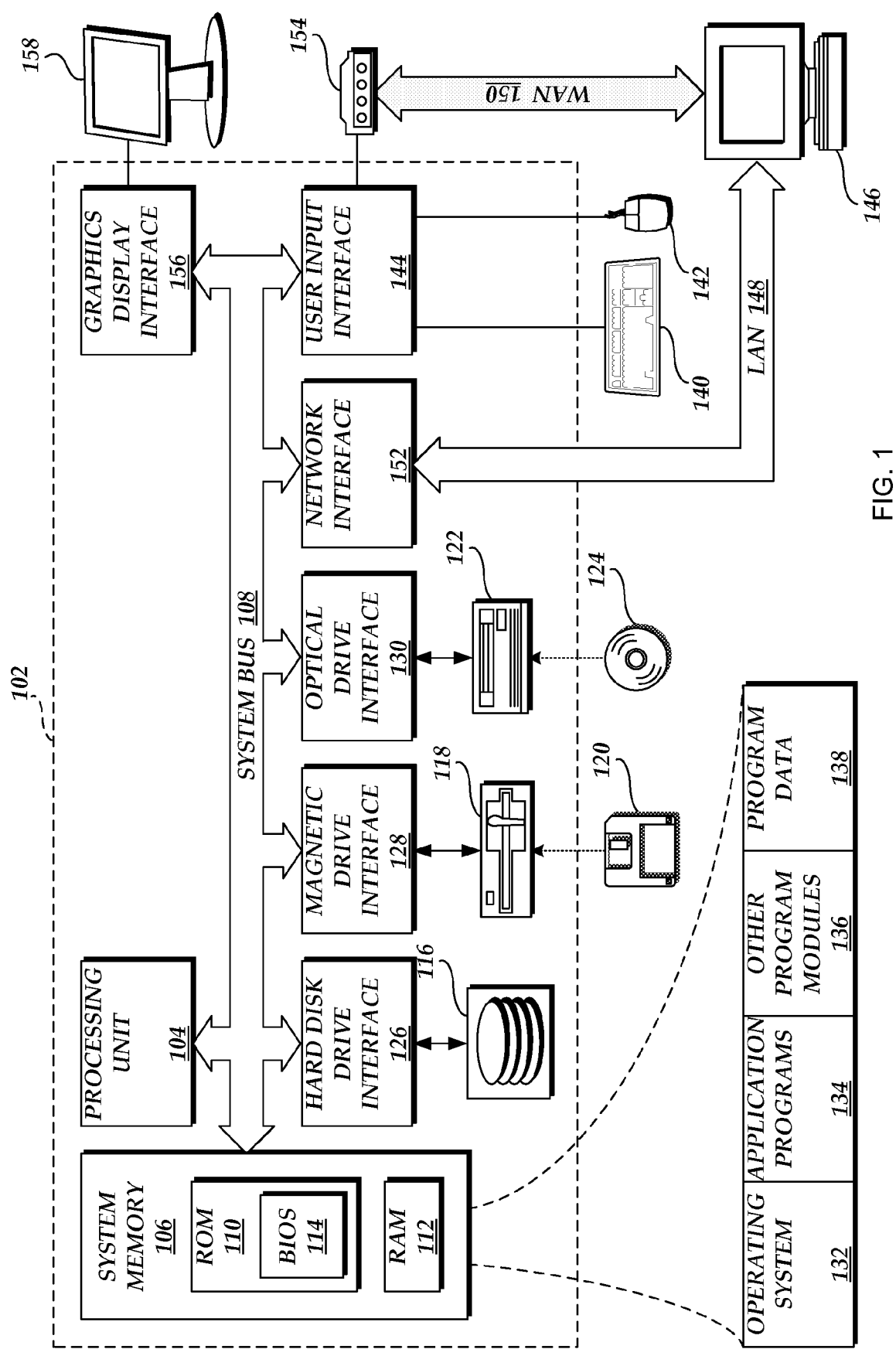
FIG. 1 illustrates an example of a suitable computing system environment.

FIG. 1 illustrates an example of a suitable computing system environment or architecture in which computing subsystems may provide processing functionality. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The method or system disclosed herein is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The method or system may be described in the general context of computer-executable instructions, such as program modules, being executed by a computer. Generally, program modules include routines, programs, objects, components, data structures, etc. that perform particular tasks or implement particular abstract data types. The method or system may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the method or system includes a general purpose computing device in the form of a computer 102. Components of computer 102 may include, but are not limited to, a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 102 typically includes a variety of computer readable media. Computer readable media can be any available media that can be accessed by computer 102 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 102. Combinations of the any of the above should also be included within the scope of computer readable storage media.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computer 102, such as during start-up, is typically stored in ROM 110. RAM 112 typically contains data and/or program modules that are immediately accessible to and/or presently being operated on by processing unit 104. By way of example, and not limitation, FIG. 1 illustrates operating system 132, application programs 134, other program modules 136, and program data 138.

The computer 102 may also include other removable/non-removable, volatile/nonvolatile computer storage media. By way of example only, FIG. 1 illustrates a hard disk drive 116 that reads from or writes to non-removable, nonvolatile magnetic media, a magnetic disk drive 118 that reads from or writes to a removable, nonvolatile magnetic disk 120, and an optical disk drive 122 that reads from or writes to a removable, nonvolatile optical disk 124 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 116 is typically connected to the system bus 108 through a non-removable memory interface such as interface 126, and magnetic disk drive 118 and optical disk drive 122 are typically connected to the system bus 108 by a removable memory interface, such as interface 128 or 130.

The drives and their associated computer storage media discussed above and illustrated in FIG. 1, provide storage of computer readable instructions, data structures, program modules and other data for the computer 102. In FIG. 1, for example, hard disk drive 116 is illustrated as storing operating system 132, application programs 134, other program modules 136, and program data 138. Note that these components can either be the same as or different from additional operating systems, application programs, other program modules, and program data, for example, different copies of any of the elements. A user may enter commands and information into the computer 102 through input devices such as a keyboard 140 and pointing device 142, commonly referred to as a mouse, trackball or touch pad. Other input devices (not shown) may include a microphone, joystick, game pad, pen, scanner, or the like. These and other input devices are often connected to the processing unit 104 through a user input interface 144 that is coupled to the system bus, but may be connected by other interface and bus structures, such as a parallel port, game port or a universal serial bus (USB). A monitor 158 or other type of display device is also connected to the system bus 108 via an interface, such as a video interface or graphics display interface 156. In addition to the monitor 158, computers may also include other peripheral output devices such as speakers (not shown) and printer (not shown), which may be connected through an output peripheral interface (not shown).

The computer 102 may operate in a networked environment using logical connections to one or more remote computers, such as a remote computer. The remote computer may be a personal computer, a server, a router, a network PC, a peer device or other common network node, and typically includes many or all of the elements described above relative to the computer 102. The logical connections depicted in FIG. 1 include a local area network (LAN) 148 and a wide area network (WAN) 150, but may also include other networks. Such networking environments are commonplace in offices, enterprise-wide computer networks, intranets and the Internet.

When used in a LAN networking environment, the computer 102 is connected to the LAN 148 through a network interface or adapter 152. When used in a WAN networking environment, the computer 102 typically includes a modem 154 or other means for establishing communications over the WAN 150, such as the Internet. The modem 154, which may be internal or external, may be connected to the system bus 108 via the user input interface 144, or other appropriate mechanism. In a networked environment, program modules depicted relative to the computer 102, or portions thereof, may be stored in the remote memory storage device. By way of example, and not limitation, remote application programs may reside on a memory device. It will be appreciated that the network connections shown are exemplary and other means of establishing a communications link between the computers may be used.

Figure 2:
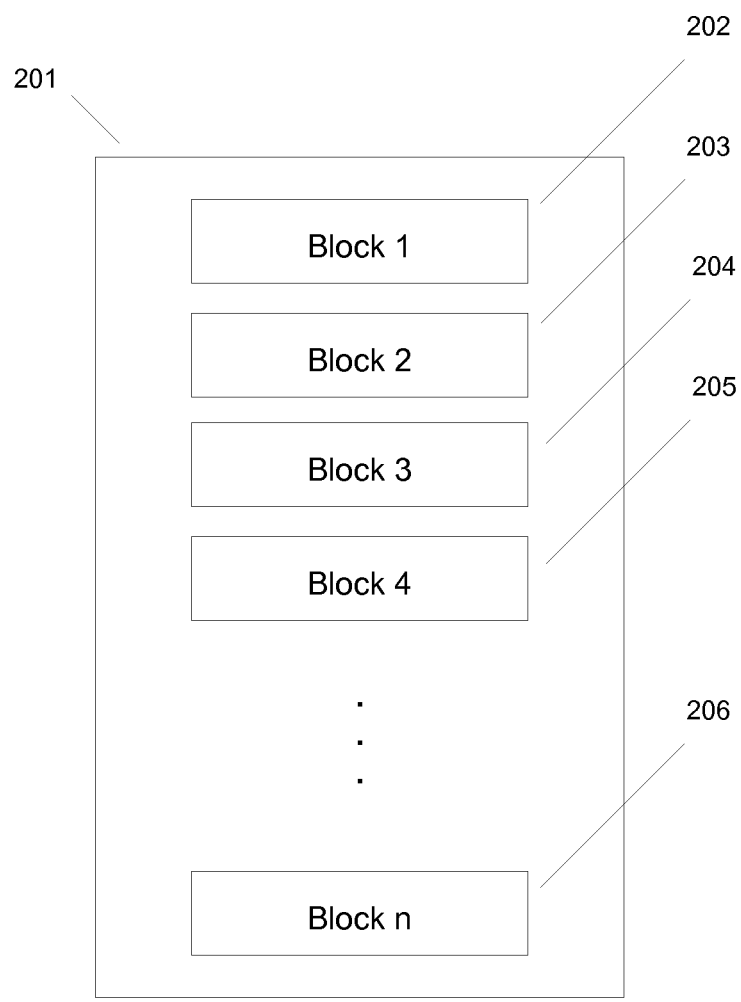
FIG. 2 illustrates an example of an application.

The computing system may further include a compiler that selects and/or lays out portions of instructions in an application. The instructions or operations may be arranged in a layout such that performance of the application may be enhanced. FIG. 2 illustrates an example of an application. The application 201 may include any number of instructions or operations. The instruction or operations may form any number or type of code blocks. In the example of FIG. 2, the application 201 contains code block 1 202, code block 2 203, code block 3 204, code block 4 205, and code block n 206. However, any number of code blocks may be present in the application.

The code blocks may be provided in a layout to enhance performance of the application. In one example, the application may be executed under any number or type of scenarios and data from the executions may be observed and/or stored. This data may include results pertaining to the operations of the application and may further be used to determine a layout for the instructions or operations of the application. These results may further be included in a profile of data that may be used in creating the layout of the instructions or operations. Depending on the layout that is created, performance of the application may be affected. For example, performance of the application may be enhanced or improved, if desired.

The profile thus created may include information describing binaries of an application. The information may describe any pertinent characteristic of the binaries such as, for example, how the binaries are executed or under what type of control flow the binaries are executed, information on threads in the application, code blocks, which code blocks are executed by which threads, which data blocks are accessed by which threads, etc. Also, the information may indicate the number of times any given portion of binaries is executed or which portions are executed and under what configuration or scenarios, information on particular code blocks that are executed, the type of data access in the data blocks, which data blocks were accessed and how, or which thread executed relative to the data blocks. In addition, a count of the number of times a given portion of binaries is executed may be maintained and/or stored. The count of the number of executions may provide information on the frequency or number of times a particular portion of the application executed over a period of time. These are merely examples, as any relevant information pertaining to the execution of an application may be observed.

The profile may be used in optimization of the application. For example, code blocks may be configured in a layout for a given procedure. Also, the code blocks that are configured in the layout for a given procedure may further be arranged or configured globally. For example, placement of procedures in a binary may be determined by globally configuring procedures containing code blocks. Optimization of an application is described in more detail below.

Figure 3:
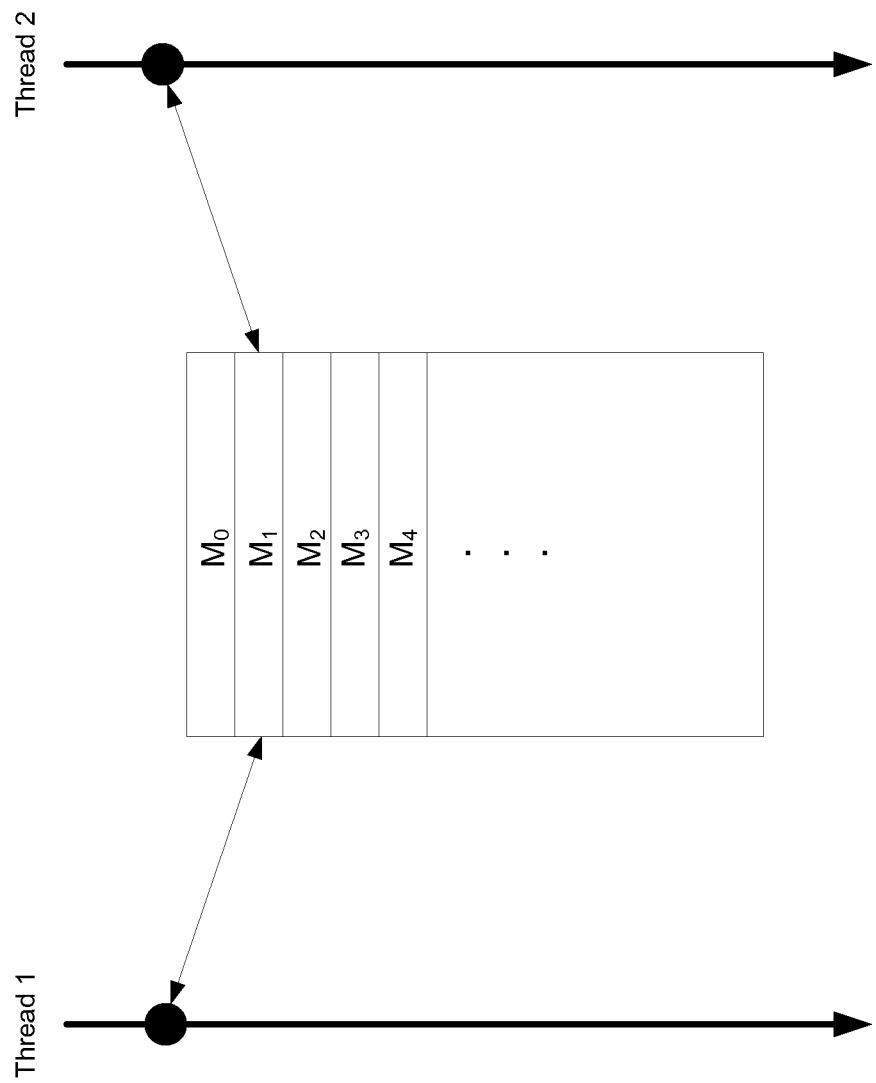
FIG. 3 illustrates an example of executing two instruction threads.

Execution of an application may also include execution of instruction threads. There may also be multiple threads being executed at a given time such that any number of threads may execute substantially simultaneously. In one example, multiple threads are executing substantially simultaneously where an operation on one thread may be conflicting with an operation on another executing thread. FIG. 3 illustrates an example in which two instruction threads are being executed. In this example, thread 1 is executing substantially simultaneously with thread 2. As FIG. 3 illustrates, thread 1 accesses a memory location ($M_1$) via an operation. However, thread 2 also accesses the same memory location ($M_1$) via an operation within a predetermined length of time of the memory location access by the operation of thread 1. In one example, thread 1 contains a write operation in which data generated from the operation of thread 1 is stored into memory location $M_1$. Thread 2 contains a read operation in which data from the memory location $M_1$ is read by the read operation of thread 2. In this case, the write operation of thread 1 and the read operation of thread 2 occur within a predetermined time period of each other. Hence, a potential conflict may exist between the operation of thread 1 and the operation of thread 2 (e.g., a data race condition may exist).

In another example, the operation of thread 1 and the operation of thread 2 are both write operations. A potential conflict may also exist in this example as the content or value of the data in the memory location may be indeterminate and may depend on which of the operations executes first (or last).

In yet another example, the threads are identified and a determination is made to keep certain threads together. A profile may be derived based on results from executions of the application. Based on the profile, a layout may be determined in order to enhance performance of the application. The layout may include certain threads being kept together with certain other threads such that the threads that are kept together in the layout may be positioned in proximity to each other. For example, the threads that are kept together may be placed adjacent to each other, may be placed within a certain predetermined distance of each other, or may be placed in a particular predetermined pattern relative to each other. The layout may further be determined such that performance of the application is enhanced or optimized.

In addition, threads may execute in a multicore processor system in which different threads may operate on different processors in the system. In one example, threads may be identified and the identified threads may be bound to a certain processor in the multicore processor system. In this way, identified threads may be configured such that the threads are executed by the same processor.

Figure 4:
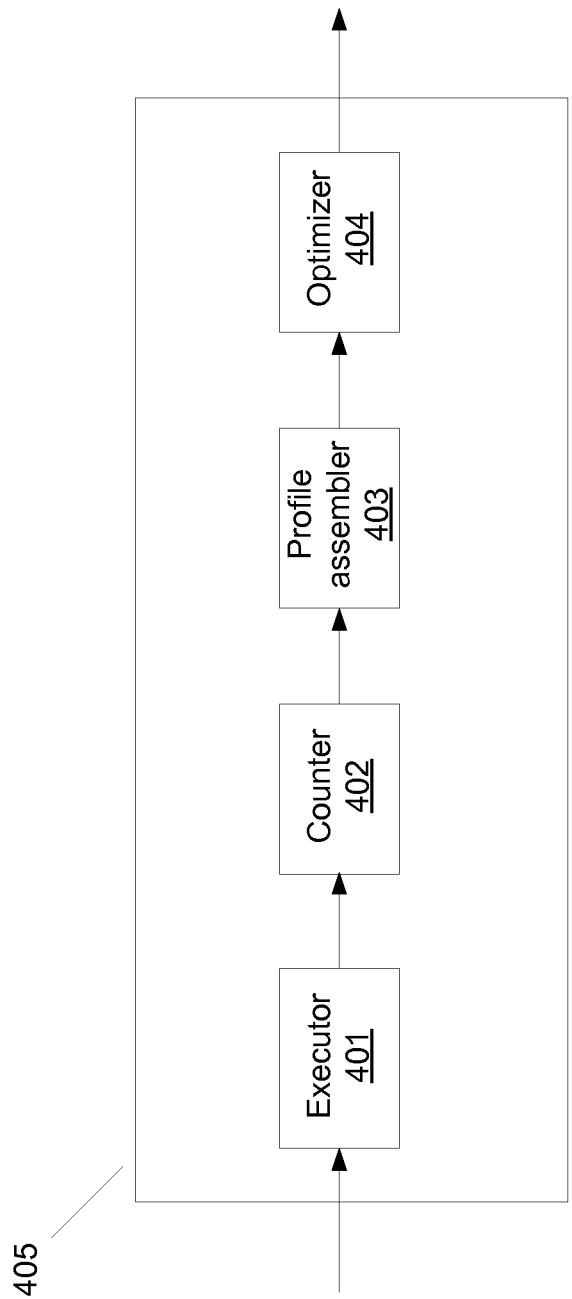
FIG. 4 illustrates an example of a system for optimizing or enhancing execution of an application.

FIG. 4 illustrates an example of a system for optimizing or enhancing execution of an application. In this example, a profiler 405 may include an executor 401, a counter 402, a profile assembler 403, and/or an optimizer 404. The system of FIG. 4 is merely one example as the components in the system may be configured in alternate ways, additional components may be present or certain components may be skipped.

In the example of FIG. 4, the executor 401 may receive an application and may execute the application in any number or type of scenarios. Based on the execution of the application, the executor 401 may generate profile data corresponding to the application. The profile data may include, for example, information pertaining to execution or control of the application or any other characteristic of the execution of the application. This may include, for example, the number of times certain code blocks are executed, the number of threads executing, the number and frequency the threads or code blocks are executed, etc.

The counter 402 of the profiler 405 may record a count of any desired parameter. For example, an application may contain any number of data blocks and the counter 402 may count the number of times each particular code block in the application is executed over the range of executions from the executor 401. Alternatively or additionally, the application may be contain instruction threads that are executed and the counter 402 may count the number of threads in the application, the number of data accesses by the threads in the application, the relative executions of the different threads of the application, the type of data access by operations of each of the threads of the applications, the temporal relationship of the data accesses of the operations of different threads of the applications, the number of times different data accesses from operations on different threads occur within a predetermined period of time, etc. These are merely examples as any parameter or characteristic may be recorded or observed via counter 402.

The profile assembler 403 may generate a profile based on information from the execution of the application by executor 401 or information from counter 402. For example, the profile assembler 403 may create a profile or data structure describing binaries of the application, the execution or control of operations of the application, or any other characteristic pertaining to the execution of the application. This profile may further be used by optimizer 404 to determine a layout of the operations, data blocks, or threads of the application. The layout may be created, for example, to enhance performance of the application or to optimize the application. In addition, the layout may contain information for binding threads to a particular processor in a multicore processor system.

Figure 5:
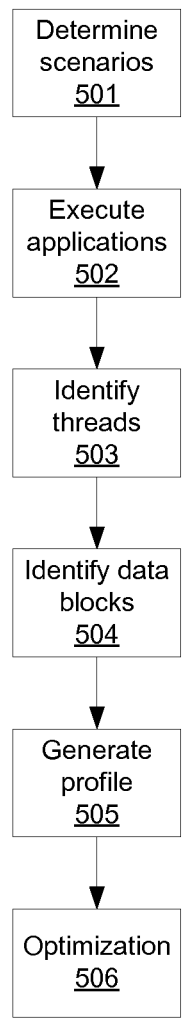
FIG. 5 is a flowchart illustrating an example of optimizing operations of an application.

Optimizing operations may be performed based on threads and/or data blocks in an application. FIG. 5 is a flowchart illustrating an example of optimizing operations of an application based on threads and data blocks in the application. Different scenarios or operating situations may be determined (STEP 501) for executing the application. The application may be executed (STEP 502) under the determined scenarios and results may be observed, evaluated and/or stored. Also, the results may be provided in a profile for optimization of the application. The application may contain any number of threads which may be identified (STEP 503) as well as data blocks (STEP 504). A profile may be generated based on the execution of the application in different scenarios and the behavior of the threads and/or data blocks of the application from the execution of the application (STEP 505). The profile may further be used to optimize the application (STEP 506). This process is described in more detail below.

Figure 6:
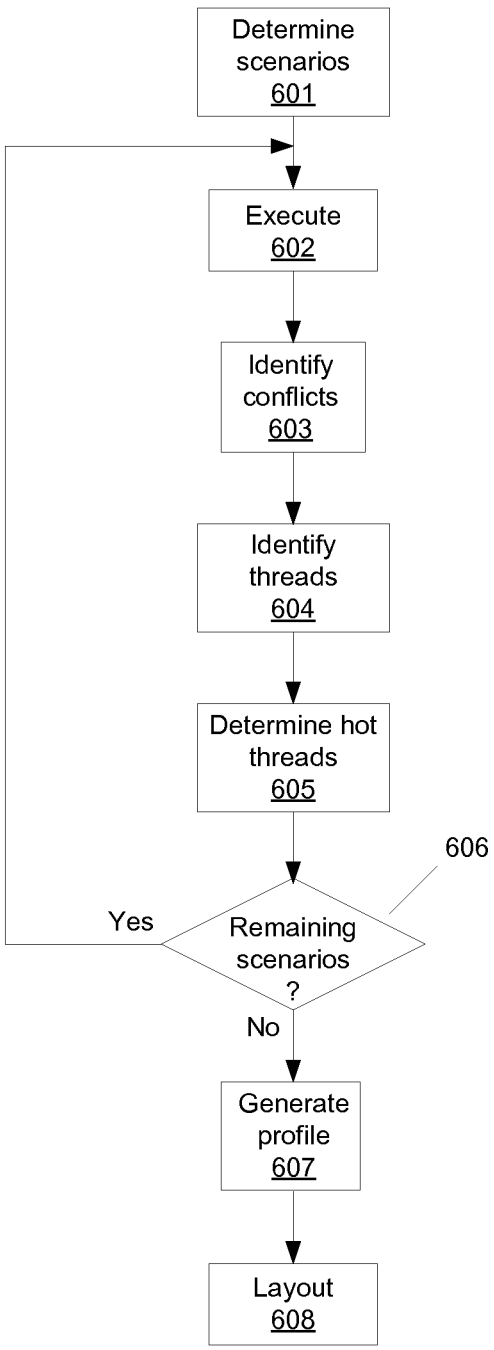
FIG. 6 is a flowchart illustrating one example of generating an application profile.

FIG. 6 is a flowchart illustrating one example of generating an application profile. An application may be executed in any number or type of scenarios in which the results of each of the executions of the application may be stored or evaluated. Evaluating of the execution of the application may include identifying threads of the application and maintaining a count of the execution of each of the identified threads. Hence, after execution of the application is complete, a count of the number of times each of the threads was executed may be obtained. For example, the hottest thread may correspond to the thread that is executed the most number of times (i.e., the thread with the highest count). Based on the counts, a layout of the data blocks or instructions of the application may be configured.

In this example, any number of scenarios may be selected (STEP 601) in which to execute an application (STEP 602). The application may contain any number of data blocks or threads which may execute in a particular sequence when the application is executed. The sequence of execution of the different data blocks or threads may vary based on the scenario chosen to execute the application. Any number of different scenarios are chosen in which to execute the application such that different patterns of execution of the code blocks or threads of the application may be observed.

Based on the different executions of the application and corresponding data blocks and/or threads of the application, conflicts may be identified (STEP 603). In one case, different threads of the application may be identified (STEP 604). Each of the threads may be executed any number of times. The frequency of execution of each of the threads may be determined based on the execution of the application in the different scenarios. A "hot" thread may be determined as a thread that is executed more than a predetermined number of times over a predetermined period of time or over a predetermined number of times of execution of the application. The predetermined threshold of times over which a thread may be considered to be a hot thread may be adjusted and may be set based on the context of the execution of the application.

Thus, a hot thread in this example is a thread of an application that is executed at a substantially high frequency such that the number of times the hot thread is executed exceeds the predetermined number. Also, any number of multiple threads associated with the application may be ranked according to the number of times each of the threads is executed. For example, a first thread may be executed the greatest number of times in the application as compared to all other threads in the application. This first thread may be indicated as a hot thread. A second thread of the application may be identified that is executed the second greatest number of times in the application as compared to all other threads in the application. This second thread may be ranked as the second hottest thread in the application. Each of the threads of interest in the application may be ranked accordingly based on how many times each of the respective threads is executed in the application. Thus, in this example, hot threads may be determined (STEP 605) based on a number of times threads are executed in an application when the application is executed under the determined scenarios.

In addition, threads of the application may also be determined to be of low (or high) priority. For example, a thread of the application may execute a number of times that is less than a certain predetermined number of times. Such a thread may be assigned a low priority whereas hot threads may be assigned a high priority. Based on the identification of high priority threads or hot threads, a layout of the threads of the application may be generated. The layout thus generated may be created in such a way as to enhance efficiency of the application.

The process may be repeated for any number or type of scenarios or group of scenarios (STEP 606). If additional scenarios are desired ("Yes" branch of STEP 606), the application may be executed (STEP 602) and additional conflicts may be identified (STEP 603), etc. When no more scenarios are desired ("No" branch of STEP 607), a profile may be generated (STEP 607) which may provide information on the application as executed under the determine scenarios. Based on the profile, the process may be laid out in a layout (STEP 608). The layout may be created in a way to optimize operations, for example. In one example, the layout of the instructions in the application may be implemented based on the identified threads and/or conflicts. For example, if hot threads are identified (e.g., STEPS 604, 605), the layout may be created to optimize operations with respect to the identified hot threads. In one example, hot threads may be grouped such that the hot threads are located in proximity to other hot threads.

In another example, the application is executed in different scenarios (STEP 601, 602) and portions of the instructions may be marked based on results from the execution under the different scenarios. Based on any identified conflicts (STEP 603), a layout of the instructions or threads may be generated to avoid the identified conflicts. For example, if multiple scenarios occur simultaneously, a potential conflict may be identified in a profile. Based on this identified conflict, the instructions are laid out to avoid the conflict so as to enhance performance of the application.

Layout of instructions, operations or data blocks of an application may be based, for example, on thread affinity. A thread of an application may be related temporally to another thread of an application, for example. A first thread or a portion thereof may execute during the execution of a second thread (or a portion of the second thread). Thus, in this example, the first thread is related temporally to the second thread in that there is a correlation in time of execution of each of the first thread and the second thread. In this case used for illustration, at least a portion of the first thread and at least a portion of the second thread execute substantially simultaneously. Hence, the first thread and the second thread of this example are related temporally (i.e., related with respect to time or timing).

Figure 7:
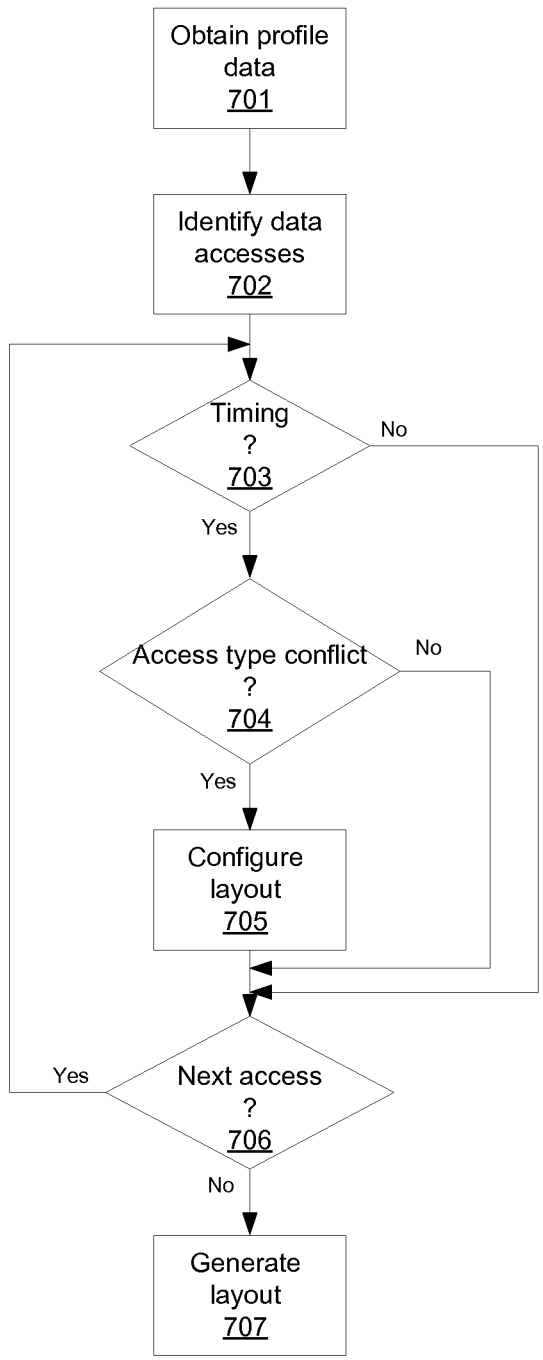
FIG. 7 is a flowchart illustrating one example of generating a layout for an application.

FIG. 7 is a flowchart illustrating one example of generating a layout for an application based on threads. In this example, profile data is generated by executing an application in any number or type of scenarios. Based on the profile (STEP 701), a layout of the application may be generated. The profile data may include, for example, information pertaining to data block or memory accesses of operations on threads of the application. For example, the application may contain any number of threads, at least some of which may be executing simultaneously or near simultaneously. In this example, a first thread may execute at a particular time (e.g., in the range of $t_0$-$t_1$) and a second thread may execute during another time period (e.g., $t_2$-$t_3$). If $t_0<t_2<t_1<t_3$, then at least a portion of the first thread executes during the execution of at least a portion of the second thread. If an operation on the first thread executes at a time that correlates closely with the execution of an operation on the second thread, then there may be a potential conflict between the operations of the two threads. By correlating closely, multiple operations on different threads may be executed with a temporal relationship such that both are executed within a predetermined period of time of each other. For example, a first operation on a first thread may be executed at time $t_x$ while a second operation on a second thread may be executed at time $t_y$, where $t_x$ and $t_y$ are either simultaneous with each other or are separated in time by a length of time that is within a predetermined period of time. Thus, in STEP 703 of this example, relative timing of the execution of operations on different threads may be determined from the profile data and may be used to determine configuration of a layout of operations of the application (STEP 703).

Similarly, the type of data access of the operation of the first thread and the type of data access of the operation of the second thread may be such as to create a potential conflict between the operations of the respective threads. For example, in STEP 704, the type of the different data accesses from the different threads may be determined. If a potential conflict exists between the two different data accesses based on the type of the respective data accesses ("Yes" branch of STEP 704), then the layout may be re-configured, if necessary, dependent on the timing and the access type. To illustrate, a first thread may contain a read operation from a memory location and a second thread may contain a write operation to the same memory location. In STEP 703, the relative time of the execution of each of the operations is determined. If the time of execution of the read operation of the first thread is within a predetermined time period of the execution of the write operation of the second thread ("Yes" branch of STEP 703), then a conflict may exist based on the relative timing of execution of the two operations.

If a potential conflict based on the relative timing of execution of the instructions or operations is found, then the type of data access for each of the operations is determined. In this case, the operation of the first thread is a read operation and the operation of the second thread is a write operation. Based on the type of data access (read and write in this example), it may be determined that a potential conflict exists. For example, data may be written into a memory location at one point in time after data from the memory location is read by an operation on a different thread. The data read from the memory location may be the prior data stored in the memory location or the new data that is written into the memory location by the operation of the second thread which may depend on which operation is performed first. In this case, a data race condition may exist in which the data read from the memory location may be indeterminate.

Conversely, certain types of data accesses may indicate that a conflict may not exist ("No" branch of STEP 704). For example, if a first instruction on a first thread is a read operation and a second operation on a second thread is also a read operation, a conflict may not exist. In this case, both operations may occur at relative times that are within a predetermined time period of each other which may indicate a conflict. However, both operations read data from a memory location and neither operation alters the data stored at the memory location. Therefore, in this example, the access types of the respective operations on the different threads may be such that a conflict does not exist ("No" branch of STEP 704).

If a conflict exists such that two operations on different threads are executed within a predetermined period of each other and the types of data access for each of the two operations are such that a conflict may exist, then the layout may be configured accordingly (STEP 705). This process may be repeated for any number or type of data access in the application (STEP 706). When data accesses of the application are each evaluated ("No" branch of STEP 706), a layout may be generated (STEP 707) in accordance with the relative timing of operations on each of multiple threads of the operations and the type of data access of the operations of the threads.

A profile data ranking may also be given to each thread based on the number of times the code blocks/instructions are executed by that thread. The higher the number of times the code blocks/instructions are executed in this example, the lower the rank of that thread. Thus, a thread with rank 1 executes a higher number of instructions than a thread with rank 2. In this example, the layout of the threads that are executed a greater number of times may have a greater impact on performance of the application than being based on all threads together or on threads that are executed a fewer number of times.

Figure 8:
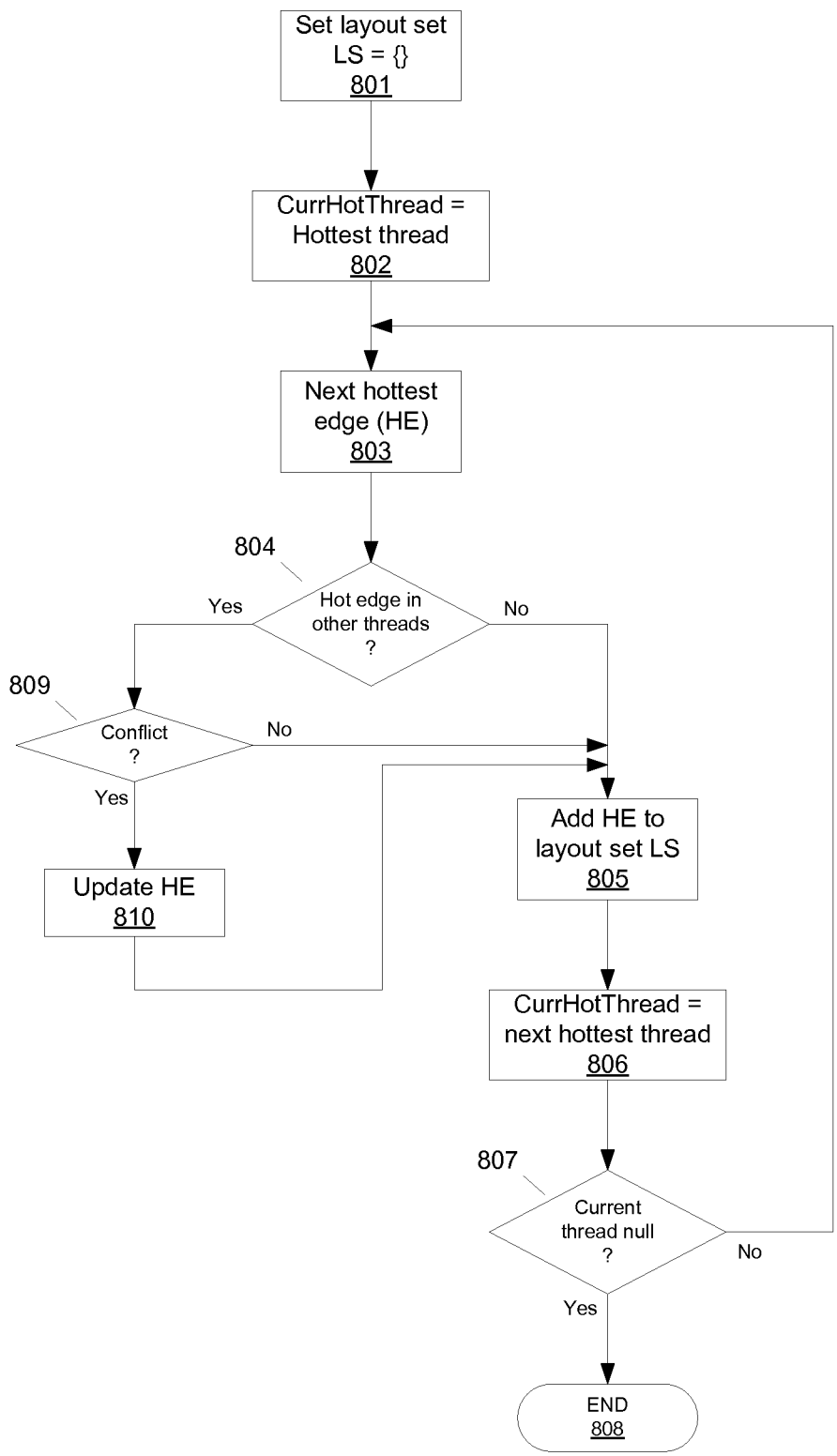
FIG. 8 is a flowchart illustrating an example of generating a layout based on threads.

FIG. 8 is a flowchart illustrating an example of generating a layout based on threads. In STEP 801, the layout set may be empty at the outset. Blocks may be added in the form of a layout based on the order of hotness of each thread and/or conflicts between threads. In STEP 802, a hot thread is identified from a group of threads that execute in an application. The hot thread may correspond to a thread that is executed the most number of times or a high number of times during execution of the application in a given scenario or group of scenarios. A layout of the instructions, operations, or data blocks of the application is generated based on the hot edges of the identified hot thread. STEPS 803, 804, 805 include the steps for using the hottest edges of a given hot thread for laying out instructions. STEPS 806 and 807 indicate the iteration of the above procedure over all the threads in the descending order of their respective profile data ranking. When all the threads are done, STEP 808 is reached which is the end of the program.

The layout may be designed to increase efficiency of the execution of the application based on the presence of the hot thread. The layout may further contain an arrangement or configuration of a first group of portions of the operations and may also have less effect on the configuration of a second group of portions of the operations in which the hot thread may not have direct effects on the second group of portions of the operations. Hence, in this example, the first group of portions of the operations of the application may be affected by the identified hot thread and arrangement or configuration of the first group of portions of the operations may be based on the hot thread.

In STEP 803, the hottest thread is identified such as the thread that is executed the highest number of times during an execution in the application. The identified hottest thread may include any number of portions of operations such as "edges." Each edge within a thread may be executed any number of times during execution of the application. For example, a first portion or edge of a thread may execute x number of times while a second portion or edge of the thread may execute y number of times. In another example, x and y are different from each other by at least one order of magnitude. The hottest thread may correspond, for example, to the thread that is executed the highest number of times, however, any portion of the identified hottest thread may be executed a number of times that is less than (or greater than) a portion on another thread.

For example, a first thread may be identified as the hottest thread in the application because the first thread is executed the highest number of times during execution of the application. However, a second thread that may be executed a number of times that is fewer than the first thread may contain a portion or edge that is executed more frequently than a portion or edge in the first thread even though the number of times the second thread is executed overall is less than the number of times the first thread is executed overall. Hence, in STEP 804 of this example, the portion or edge of the second thread that is executed a higher number of times than a portion or edge of the first thread is identified by comparing an edge or portion of the first thread (i.e., hottest thread in this example) with a portion of the second thread.

In one example, the hottest thread is identified as being the thread in the application that is executed the greatest number of times during execution of the application. Each portion or edge in the hottest thread is identified (STEP 803) and compared to other edges in other threads of the application (STEP 804). If a given portion or edge in the hottest thread is hotter than any of the other portions or edges in the other threads of the application ("No" branch of STEP 804), the portion or edge of the hottest thread may be added to the layout set LS (STEP 805).

Otherwise, another thread (e.g., a second thread) may contain a portion or edge that is executed a greater number of times than the portion of the hottest thread ("Yes" branch of STEP 804). In this case, the edge in the second thread may be hotter than the portion or edge in the hottest thread. Also, a conflict may be detected between the edges of the two threads (STEP 809). For example, the edge of the first (hottest) thread may conflict with an edge in the second thread even though the edge of the second thread is hotter than the portion or edge of the first thread. If the conflict is detected ("Yes" branch of STEP 809), the layout may be modified (STEP 805) based on updating of the hottest edge of the second thread (STEP 810). Hence, in such cases the hot "edge" of the second thread may be considered for the layout set LS (STEP 810) because the hot "edge" of the second thread is hotter than a corresponding portion or edge of the hottest thread.

Otherwise, the edge of the hottest thread may be the hotter portion or edge as compared to the edge of the second thread. In this case ("No" branch of STEP 809), the hottest edge from the hottest thread may be added to the layout set (STEP 805) without modification of the edge of the second thread.

After each of the edges or portions/regions of the hottest thread is compared to other edges/portions/regions of the other threads in the application, the next hottest thread is examined (STEP 806). For example, after the first or hottest thread is complete, the thread that is the second hottest thread of the application (i.e., the thread that is executed the second most number of times in the application) may be evaluated. Similarly, each portion/region/edge of the second hottest thread may be compared to each edge of the remaining threads. If a given edge of the second hottest thread is hotter than each of the portions or edges of the other remaining threads, the given edge of the second hottest thread may be added to the layout set LS (STEP 805). Otherwise, if a portion or edge of another thread in the application is hotter than a given portion of the second hottest thread ("Yes" branch of STEP 804) and a conflict is detected between the two respective edges of threads ("Yes" branch of STEP 809), then the hotter edge of the other thread may be updated (STEP 810) and added to the layout set LS (STEP 805). Otherwise, the hot edge or portion of the hottest thread may be added to the layout set LS (STEP 805).

After each of the threads are evaluated and each of the relevant edges or portions of the threads are added to the layout set LS, the process is complete. In this example, the layout is achieved based on the hottest threads or hottest portions/edges of threads in the application.

Figure 9:
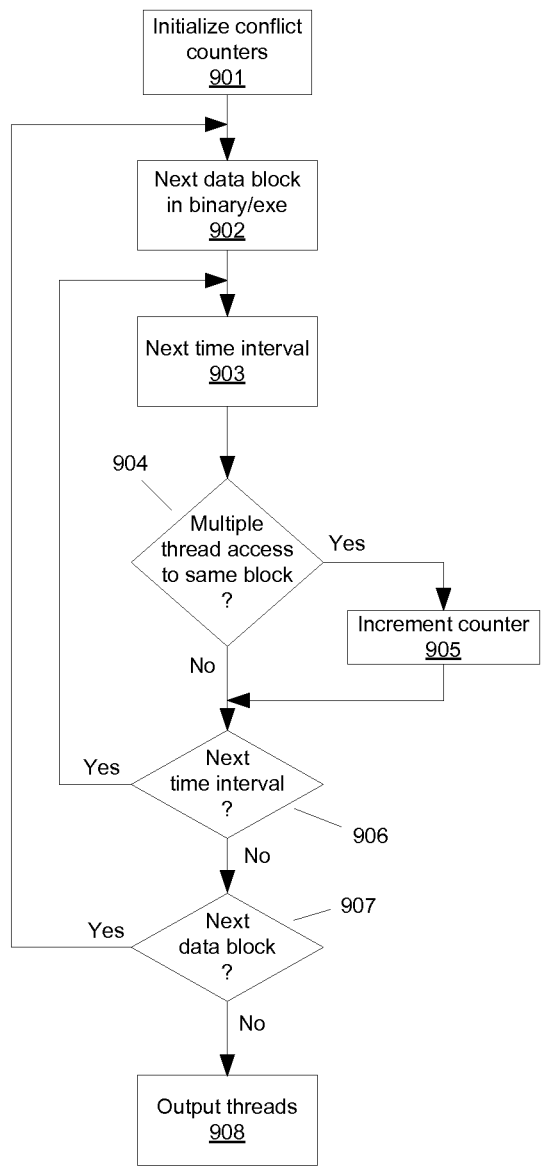
FIG. 9 illustrates one example of identifying potential conflict points in various execution scenarios.

A conflict may exist in a document as an instance in time (or during a predetermined time period) in which accesses to the same data block (e.g., reading from or writing to a data location in the data block) are performed by multiple threads. FIG. 9 depicts one example of identifying potential conflict points in a binary/EXE using a memory access profile of the binary in various execution scenarios. STEP 901 initializes conflict counters. The conflict counters may be used to track the number of times a conflict is encountered and/or which threads or combination of threads are involved in the conflict. In STEPS 902 and 903, the process of identifying conflicting threads and updating a conflict counter is repeated over all or substantially all the data blocks (STEP 902) and in all or substantially all time intervals (STEP 903). In a given time interval, conflicts (i.e., simultaneous memory accesses or multiple memory accesses within a predetermined period of time from different threads) are detected (STEP 904). If such a conflict is detected, "Yes" of STEP 904), the conflict counter may be incremented (STEP 905) to indicate that a conflict is identified between the two identified threads. The process may be repeated for each time interval (STEP 906) and/or for each data block (STEP 907). After the each of the relevant time intervals for each of the relevant data blocks have been completed, information indicating which threads have associated conflicts that exceed a predetermined threshold and/or a number of conflicts associated with each of the threads. Any relevant information of conflicts between threads may be provided (STEP 908). For example, the information may include an identification of conflicts, which threads are involved in which conflicts, frequency of conflicts between which threads, etc. The information may be provided (e.g., output) to a user.

Figure 10:
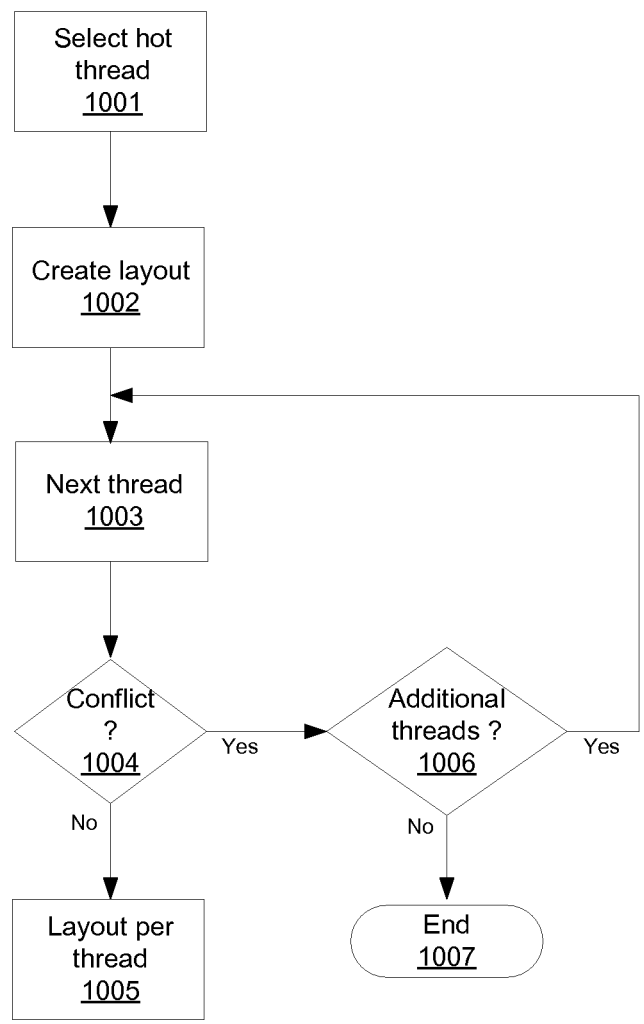
FIG. 10 is a flowchart illustrating another example of generating a layout for an application.

FIG. 10 is a flowchart illustrating an example of generating a layout based on threads. In STEP 1001, a hot thread is identified from a group of threads that execute in an application. The hot thread may correspond to a thread that is executed the most number of times during execution of the application in a given scenario or group of scenarios. A layout of the instructions, operations, or code blocks of the application is generated (STEP 1002) based on the identified hot thread. For example, the layout may be designed to increase efficiency of the execution of the application based on the presence of the hot thread. The layout may further contain an arrangement or configuration of a first group of portions of the operations and may also have less effect on the configuration of a second group of portions of the operations in which the hot thread may not have direct effects on the second group of portions of the operations. Hence, in this example, the first group of portions of the operations of the application may be affected by the identified hot thread and arrangement or configuration of the first group of portions of the operations may be based on the hot thread.

In STEP 1003, another thread in the application may be observed relative to the identified hot thread. Conflicts between the other thread and the identified hot thread are identified (STEP 1004). For example, the other thread may include an operation on a code block that conflicts with an operation on the identified hot thread and the two operations may occur at times that are either simultaneous or within a predetermined period of time of each other. In this case, a conflict may be detected ("Yes" branch of STEP 1004) and additional threads, if any, are detected (STEP 1006). If additional threads are detected, then the process may repeat with remaining threads (STEP 1003) to determine if conflicts exist between any of the other threads and the identified hot thread. If a conflict is not detected between the hot thread and another thread ("No" branch of STEP 1004), then the layout of the operations or code blocks of the application may be configured based on the other identified (non-conflicting) thread (STEP 1005). When each thread is compared for conflicts, the process ends (STEP 1007, "No" branch of STEP 1006).

In another example, each of the detected threads may be ranked according to number of times executed in the application. For example, a first thread may be identified as the hottest thread as being the thread that is executed the most number of times (highest data count). A second thread may be identified as the second hottest thread (second highest data count). A third thread may be identified as the third hottest thread (third highest data count), etc. In this case, each thread may be evaluated with respect to the first thread to determine if conflicts exist. In this example, the first thread is identified as the hottest thread and a layout is created of code blocks in the application based on the first thread being the hottest thread. The second thread (second hottest thread) is compared to the first thread to identify any conflicts. If there are no conflicts identified, then at least a portion of the remainder of the code blocks may be configured based on the second thread. This process may continue for any number or type of identified threads.

In another example, an application may contain any number or type of code blocks (e.g., FIG. 2). Execution of the application may result in execution of certain code blocks. Any of the code blocks may be executed any number of times in different scenarios. A counter may be maintained to determine the number of times any particular code block is executed. Optimization of the instructions or code blocks of the application may be obtained via a layout based on the number of times each of the code blocks in the application are executed.

Figure 11:
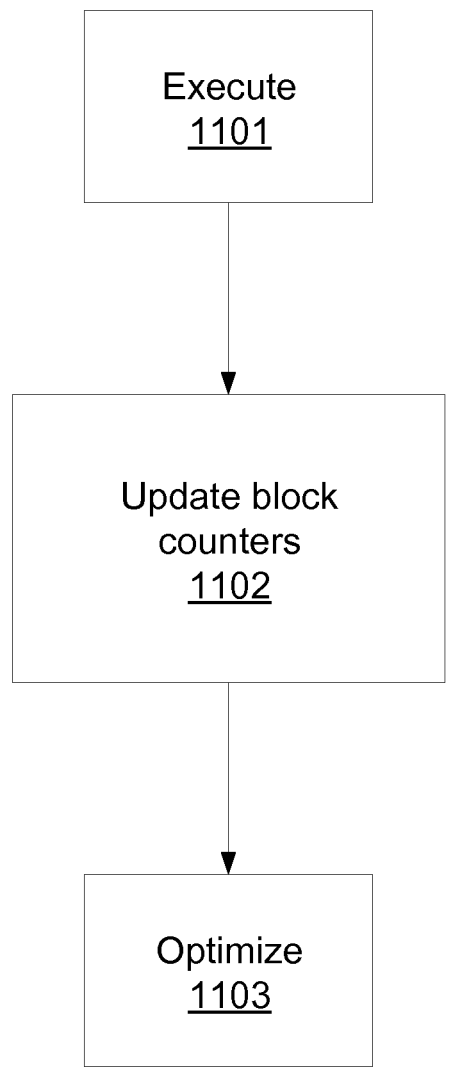
FIG. 11 is a flowchart illustrating an example of a code block implementation of optimization of an application.

FIG. 11 is a flowchart illustrating an example of a code block implementation of optimization of an application. In this example, an application is executed (STEP 1101). The application may be executed any number of times and under any number or type of scenario. The application may further include any number or type of code blocks (e.g., FIG. 2). Different code blocks of the application may be executed at a different frequency or a different number of times. A counter is maintained such that each time a code block of the application is executed during execution of the application, the counter is updated or incremented (STEP 1102). Thus, each code block in the application may have an associated counter indicating the number of times the corresponding block was executed upon execution of the application in different scenarios. This data may be used for creating a layout of the code blocks or for optimization of the application.

In one example, a code block may be identified to be kept together with another code block. For example, a first code block and a second code block may be identified as frequently executed code blocks in the application. The first code block and the second code block may be identified as keep together code blocks such that the first and second code blocks may be placed together in the layout. Keeping the first and second code blocks together may include placing the first code block within a predetermined distance of the second code block, in proximity to the second code block or placing the first code block adjacent to the second code block in the layout. In addition, the distance between the first code block and the second code block may be adjusted based on the context of the application.

It is understood that aspects of the present description can take many forms and embodiments. The embodiments shown herein are intended to illustrate rather than to limit the description, it being appreciated that variations may be made without departing from the spirit of the scope of the invention. Although illustrative embodiments have been shown and described, a wide range of modification, change and substitution is intended in the foregoing disclosure and in some instances some features may be employed without a corresponding use of the other features. Accordingly, it is appropriate that the appended claims be construed broadly and in a manner consistent with the scope of the invention.

The invention claimed is:

1. A method associated with an application, comprising:
identifying a first thread and a second thread of a plurality of threads of an application;
determining a potential conflict between a first operation of the first thread and a second operation of the second thread, the determining a potential conflict comprising determining that the first operation and the second operation access a first memory location within a threshold time window, at least one of the first operation or the second operation comprising a write operation;
comparing a frequency of execution of a first edge comprised in the first thread to a frequency of execution of a second edge comprised in the second thread; and
at least one of creating or modifying a layout based at least in part on at least one of the potential conflict or the comparison.

2. The method of claim 1, the layout comprising an arrangement of one or more operations associated with the application.

3. The method of claim 1, the modifying a layout comprising:
modifying the layout based at least in part on a determination that a conflict exists between the first operation of the first thread and the second operation of the second thread, the first thread a hottest thread of the plurality of threads.

4. The method of claim 1, the creating a layout comprising:
creating the layout based at least in part on a profile of the plurality of threads, the profile based at least in part on an execution of the plurality of threads.

5. The method of claim 1, the first edge comprising a portion of the first operation, the second edge comprising a portion of the second operation.

6. The method of claim 1, the creating a layout comprising:
generating a layout set comprising the first edge if the frequency of execution of the first edge is higher than the frequency of execution of the second edge.

7. The method of claim 1, the creating a layout comprising:
generating a layout set comprising the second edge if the frequency of execution of the second edge is higher than the frequency of execution of the first edge.

8. A computer storage hardware storing computer executable instructions which when executed by a processor perform a method comprising:
identifying a first thread and a second thread of a plurality of threads of an application, the first thread comprising a first operation, the second thread comprising a second operation;
determining a potential conflict between the first operation and the second operation, the determining a potential conflict comprising comparing a frequency of execution of a first edge corresponding to the first operation to a frequency of execution of a second edge corresponding to the second operation; and at least one of creating or modifying a layout based at least in part on the potential conflict.

9. The computer storage hardware of claim 8, the method comprising:
identifying a conflict between the first operation and the second operation.

10. The computer storage hardware of claim 9, the method comprising:
binding the first thread and the second thread to a same processor based at least in part on the identifying a conflict.

11. The computer storage hardware of claim 9, the method comprising:
marking the first thread and the second thread based at least in part on the identifying a conflict.

12. The computer storage hardware of claim 11, the creating a layout comprising:
configuring one or more non-compiled application code blocks of the application within the layout based at least in part on the marking the first thread and the second thread.

13. The computer storage hardware of claim 9, the creating a layout comprising:
creating the layout based at least in part on the identifying a conflict.

14. A system comprising:
one or more processing units; and
memory comprising instructions that when executed by at least one of the one or more processing units perform a method comprising:
identifying a first thread and a second thread of a plurality of threads of an application;
determining a potential conflict between a first operation of the first thread and a second operation of the second thread, the determining a potential conflict comprising determining that the first operation and the second operation access a first memory location within a threshold time window, at least one of the first operation or the second operation comprising a write operation;
comparing a frequency of execution of a first edge comprised in the first thread to a frequency of execution of a second edge comprised in the second thread; and
at least one of creating or modifying a layout based at least in part on at least one of the potential conflict or the comparison.

15. The system of claim 14, the layout comprising an arrangement of one or more operations associated with the application.

16. The system of claim 14, the modifying a layout comprising:
modifying the layout based at least in part on a determination that a conflict exists between the first operation of the first thread and the second operation of the second thread, the first thread a hottest thread of the plurality of threads.

17. The system of claim 14, the creating a layout comprising:
creating the layout based at least in part on a profile of the plurality of threads, the profile based at least in part on an execution of the plurality of threads.

18. The system of claim 14, the first edge comprising a portion of the first operation, the second edge comprising a portion of the second operation.

19. The system of claim 14, the creating a layout comprising:
generating a layout set comprising the first edge if the frequency of execution of the first edge is higher than the frequency of execution of the second edge.

20. The system of claim 14, the creating a layout comprising:
generating a layout set comprising the second edge if the frequency of execution of the second edge is higher than the frequency of execution of the first edge.

* * * * *